US011693104B2

(12) United States Patent
Lien et al.

(10) Patent No.: US 11,693,104 B2
(45) Date of Patent: *Jul. 4, 2023

(54) RADAR ANGULAR AMBIGUITY RESOLUTION

(71) Applicant: Google LLC, Mountain View, CA (US)

(72) Inventors: Jaime Lien, Mountain View, CA (US); Octavio Ponce Madrigal, Munich (DE); Patrick M. Amihood, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/164,637

(22) Filed: Feb. 1, 2021

(65) Prior Publication Data

US 2021/0156985 A1 May 27, 2021

Related U.S. Application Data

(63) Continuation of application No. 15/844,460, filed on Dec. 15, 2017, now Pat. No. 10,935,651.

(51) Int. Cl.
*G01S 13/42* (2006.01)
*G01S 7/41* (2006.01)
*G01S 13/02* (2006.01)

(52) U.S. Cl.
CPC ............ *G01S 13/426* (2013.01); *G01S 7/412* (2013.01); *G01S 13/422* (2013.01); *G01S 2013/0254* (2013.01)

(58) Field of Classification Search
CPC . G01S 13/426; G01S 7/412; G01S 2013/0254
See application file for complete search history.

(56) References Cited

U.S. PATENT DOCUMENTS 5,768,477 A 6/1998 Johnson et al.
5,831,570 A 11/1998 Ammar et al.
(Continued)

FOREIGN PATENT DOCUMENTS

CN 105122079 12/2015
CN 106796283 5/2017
(Continued)

OTHER PUBLICATIONS

"Corrected Notice of Allowability", U.S. Appl. No. 15/844,460, dated Nov. 23, 2020, 2 pages.
(Continued)

*Primary Examiner* — Marcus E Windrich
(74) *Attorney, Agent, or Firm* — Colby Nipper PLLC

(57) ABSTRACT

Techniques and apparatuses are described for radar angular ambiguity resolution. These techniques enable a target's angular position to be determined from a spatial response that has multiple amplitude peaks. Instead of solely considering which peak has a highest amplitude, the techniques for radar angular ambiguity resolution select a frequency subspectrum, or multiple frequency sub-spectrums, that emphasize amplitude or phase differences in the spatial response and analyze an irregular shape of the spatial response across a wide field of view to determine the target's angular position. In this way, each angular position of the target has a unique signature, which the radar system can determine and use to resolve the angular ambiguities. Using these techniques, the radar can have an antenna array element spacing that is greater than half a center wavelength of a reflected radar signal that is used to detect the target.

20 Claims, 11 Drawing Sheets

(56) References Cited

U.S. PATENT DOCUMENTS

| | | | |
|---|---|---|---|
| 7,015,855 | B1 | 3/2006 | Medl et al. |
| 9,562,968 | B2 | 2/2017 | Wu |
| 9,739,877 | B2* | 8/2017 | Fehrenbach ............ G01S 13/02 |
| 9,817,109 | B2 | 11/2017 | Saboo et al. |
| 10,935,651 | B2 | 3/2021 | Lien et al. |
| 11,573,311 | B2 | 2/2023 | Gillian et al. |
| 2007/0025723 | A1 | 2/2007 | Baudisch et al. |
| 2007/0285315 | A1* | 12/2007 | Davis ..................... H01Q 21/22 342/377 |
| 2009/0239551 | A1* | 9/2009 | Woodsum ................ H04B 7/26 342/377 |
| 2011/0090981 | A1* | 4/2011 | Lindgren ............. H04B 7/0689 375/267 |
| 2013/0116561 | A1* | 5/2013 | Rothberg ............. A61B 8/4477 600/459 |
| 2014/0159945 | A1 | 6/2014 | Chung et al. |
| 2016/0018509 | A1* | 1/2016 | Mccorkle .................. G01S 5/12 342/386 |
| 2016/0146932 | A1* | 5/2016 | Millar .................... G01S 13/931 342/175 |
| 2016/0252608 | A1* | 9/2016 | Ebling ................ G01S 13/4454 342/149 |
| 2016/0350620 | A1 | 12/2016 | Rao et al. |
| 2017/0097413 | A1 | 4/2017 | Gillian et al. |
| 2017/0117946 | A1* | 4/2017 | Lee ............................ G01S 3/72 |
| 2017/0212205 | A1* | 7/2017 | Bialer ........................ G01S 3/50 |
| 2018/0011180 | A1* | 1/2018 | Warnick ................... H01Q 3/34 |
| 2018/0131089 | A1* | 5/2018 | Yilmaz ................ H01Q 21/065 |
| 2018/0183650 | A1 | 6/2018 | Zhang et al. |
| 2019/0187268 | A1 | 6/2019 | Lien et al. |
| 2019/0394838 | A1* | 12/2019 | Metodiev ............... B33Y 10/00 |
| 2020/0058310 | A1* | 2/2020 | Goodwin ................ G10L 19/00 |
| 2020/0104613 | A1 | 4/2020 | Hirai |
| 2020/0355817 | A1 | 11/2020 | Gillian et al. |
| 2022/0155440 | A1* | 5/2022 | Kruse ................. G01S 15/8915 |
| 2022/0283322 | A1* | 9/2022 | Faragher ................. G01S 19/23 |

FOREIGN PATENT DOCUMENTS

| | | |
|---|---|---|
| DE | 4240789 | 6/1994 |
| WO | 2007023371 | 3/2007 |
| WO | 2011104673 | 9/2011 |
| WO | 2016200466 | 12/2016 |
| WO | 2019118013 | 6/2019 |
| WO | 2019195327 | 10/2019 |

OTHER PUBLICATIONS

"EP Appeal Decision", European Application No. 10194359.5, May 28, 19, 20 pages.

"First Action Interview Office Action", U.S. Appl. No. 15/844,460, dated Jul. 1, 2020, 3 Pages.

"Galaxy S4 Air Gesture", Galaxy S4 Guides, retrieved from: https://allaboutgalaxys4.com/galaxy-s4-features-explained/air-gesture/ on Sep. 3, 2019, 4 pages.

"International Preliminary Report on Patentability", PCT Application No. PCT/US2019/025436, dated Oct. 15, 2020, 12 pages.

"International Preliminary Report on Patentability", PCT Application No. PCT/US2018/047446, dated Jun. 25, 2020, 14 pages.

"International Search Report and Written Opinion", PCT Application No. PCT/US2018/047446, dated Dec. 21, 2018, 21 pages.

"International Search Report and Written Opinion", PCT Application No. PCT/US2019/025436, dated Jul. 11, 2019, 19 pages.

"Invitation to Pay Additional Fees", PCT Application No. PCT/US2018/047446, dated Oct. 23, 2018, 12 pages.

"Notice of Allowance", U.S. Appl. No. 15/844,460, dated Oct. 23, 2020, 9 pages.

"Pre-Interview Communication", U.S. Appl. No. 15/844,460, dated May 14, 2020, 3 Pages.

"Restriction Requirement", U.S. Appl. No. 15/844,460, dated Mar. 24, 2020, 6 Pages.

"Samsung Galaxy S4 Air Gestures", Video retrieved from https://www.youtube.com/watch?v=375Hb87yGcg, May 7, 2013, 4 pages.

Fonseca, et al., "On the Design of a Compact Neural Network-Based DOA Estimation System", IEEE Transactions on Antennas and Propagation, IEEE Service Center, Piscataway, NJ, US, vol. 58, No. 2, Feb. 2010, pp. 357-366.

"Foreign Office Action", EP Application No. 18765260.7, dated Mar. 16, 2022, 8 pages.

"Non-Final Office Action", U.S. Appl. No. 16/772,760, dated Jun. 2, 2022, 47 pages.

"Corrected Notice of Allowance", U.S. Appl. No. 15/844,460, dated Feb. 4, 2021, 2 pages.

"Foreign Office Action", CN Application No. 201880036085.5, dated Jan. 11, 2023, 20 pages.

"Notice of Allowance", U.S. Appl. No. 16/772,760, dated Sep. 23, 2022, 15 pages.

"Foreign Office Action", CN Application No. 201980006063.9, dated Feb. 3, 2023, 11 pages.

* cited by examiner

RADAR ANGULAR AMBIGUITY RESOLUTION

CROSS-REFERENCE TO RELATED APPLICATION

The present application is a continuation of and claims priority to U.S. patent application Ser. No. 15/844,460, filed Dec. 15, 2017, the entire disclosure of which is hereby incorporated by reference.

BACKGROUND

Radars are useful devices that can detect and track objects, map surfaces, and map weather patterns. While radar is a common tool used in military and air-traffic-control operations, technological advances are making it possible to integrate radars in electronic devices. In many cases, a radar may replace bulky and expensive sensors, such as a camera, and provide improved performance in the presence of different environmental conditions, such as low lighting and fog, or with moving or overlapping targets. While it may be advantageous to use the radar, there are many challenges associated with using radar in commercial devices.

One such problem involves integrating the radar in consumer devices. In particular, smaller consumer devices place restrictions on a radar antenna's design. To satisfy size or layout constraints, for example, fewer antenna elements and larger or smaller spacing between the antenna elements may be used. This radar antenna design, however, may be at the expense of angular ambiguities that make it challenging for the radar to estimate an angular position of a target. Without being able to determine the target's location due to the angular ambiguities, effective operation and capability of the radar is significantly reduced, thereby frustrating users or limiting the types of applications or environments the radar can support.

SUMMARY

Techniques and apparatuses are described that enable radar angular ambiguity resolution. These techniques enable a target's angular position to be determined from a spatial response that has multiple amplitude peaks. Instead of solely considering which peak has a highest amplitude, the techniques for radar angular ambiguity resolution select a frequency sub-spectrum, or multiple frequency sub-spectrums, that emphasize amplitude or phase differences in the spatial response and analyze an irregular shape of the spatial response across a wide field of view to determine the target's angular position. In this way, each angular position of the target has a unique signature, which the radar system can determine and use to resolve the angular ambiguities. Using these techniques, the radar can have an antenna array element spacing that is greater than half a center wavelength of a reflected radar signal that is used to detect the target.

Aspects described below include a radar system with a frequency selector, an antenna array, a digital beamformer, and an angle estimator. The frequency selector is configured to select a transmission frequency spectrum of a radar signal and cause a transmitter to transmit the radar signal using the transmission frequency spectrum. The antenna array is configured to receive the radar signal using at least three antenna elements. The digital beamformer is configured to generate, based on the received radar signal, a spatial response across a field of view, the spatial response having a shape across the field of view. The angle estimator is configured to analyze a shape of the spatial response across the field of view. Based on the shape of the spatial response, the angle estimator is also configured to determine an angle of arrival of the radar signal to estimate an angular position of a target that reflected the radar signal.

Aspects described below also include a method that selects a transmission frequency spectrum of a radar signal. The method also includes transmitting the radar signal using the transmission frequency spectrum and receiving, via the antenna array, the radar signal that is reflected by a target. Based on the received radar signal, a spatial response across a field of view is generated. The spatial response includes an amplitude response and a phase response. In addition, the method includes analyzing a shape of the amplitude response and a shape of the phase response to identify a characteristic of the shape of the amplitude response and another characteristic of the shape of the phase response. The shape of the amplitude response has at least two peaks within the field of view, the at least two peaks associated with an angular ambiguity. Based on the characteristic and the other characteristic, the angular ambiguity within the field of view of the spatial response is resolved to determine a direction of the target that reflected the radar signal.

Aspects described below also include another method that transmits a radar signal using a frequency spectrum. The method also includes receiving, via an antenna array, the radar signal that is reflected by a target. In addition, the method includes partitioning the frequency spectrum into at least two frequency sub-spectrums and generating at least two spatial responses for the at least two frequency sub-spectrums. The method further includes performing complex coherence on the at least two spatial responses to generate at least one phase coherence map. Based on the phase coherence map, the angular position of the target is estimated.

Aspects described below also include a system with means for determining a transmission frequency spectrum based on an element spacing of an antenna array, means for analyzing a shape of a spatial response, and means for determining an angle of arrival of a reflected radar signal based on the shape of the spatial response.

BRIEF DESCRIPTION OF THE DRAWINGS

Apparatuses for and techniques enabling radar angular ambiguity resolution are described with reference to the following drawings. The same numbers are used throughout the drawings to reference like features and components:

FIG. 2-1 illustrates example beamsteering for target detection.

FIG. 2-2 illustrates an example angular ambiguity.

DETAILED DESCRIPTION

Overview

Figure 1:
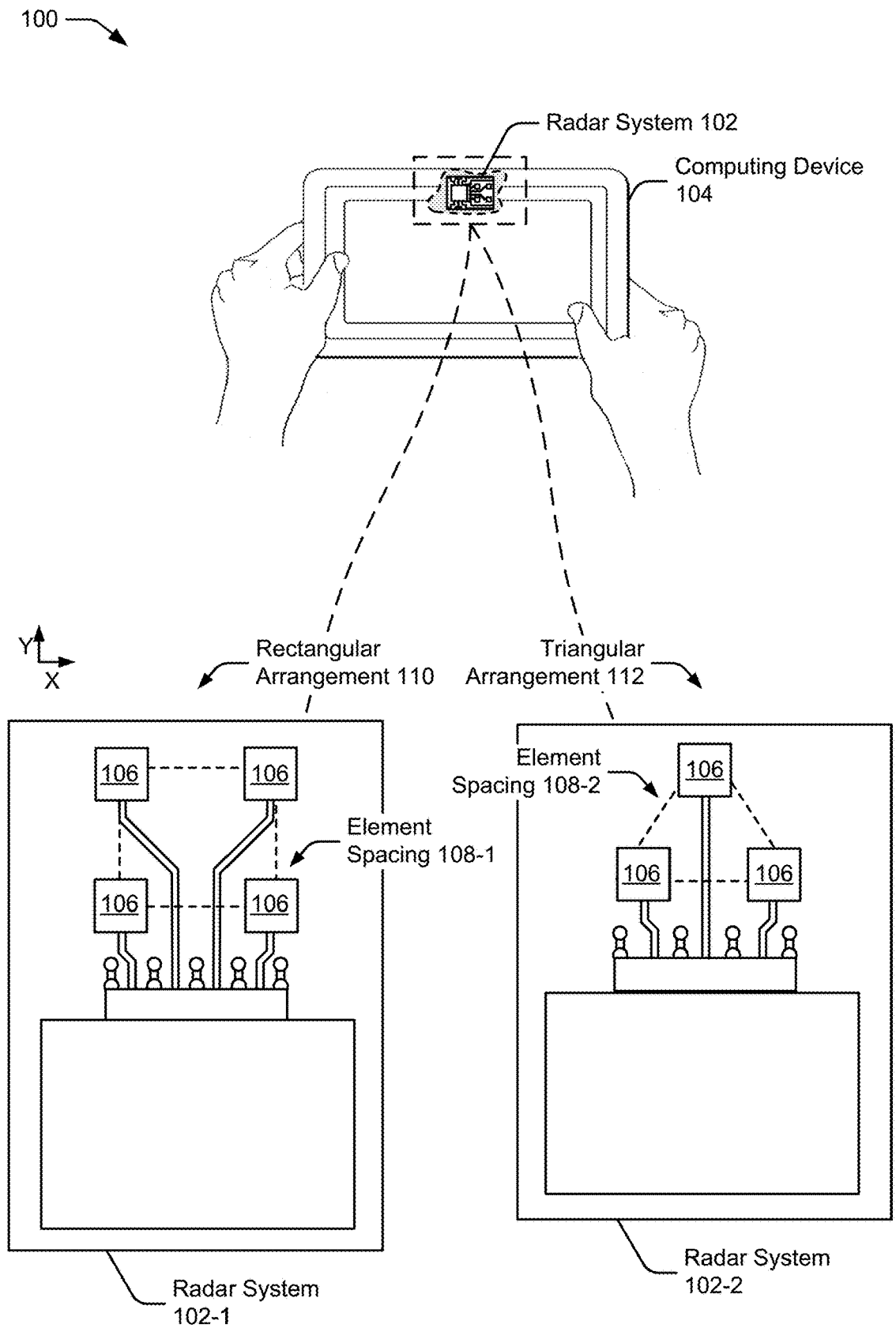
FIG. 1 illustrates an example environment in which radar angular ambiguity resolution can be implemented.

This document describes techniques and devices for radar angular ambiguity resolution. These techniques and devices are designed to determine a target's angular position by resolving angular ambiguities that result from the radar antenna's design and a radar signal's wavelength. In particular, antenna array element spacings that are larger than half of the wavelength can significantly increase a number of the angular ambiguities, making it challenging to distinguish a direction of arrival of a reflected radar signal. In general, the angular ambiguities are dependent upon the distribution of the antenna array elements and a center wavelength of the radar signal (e.g., a wavelength that corresponds to a center frequency of the radar signal).

Conventional angular estimation techniques identify an angular position of a target based on a peak amplitude of a spatial response. In other words, the target's location is determined based on an azimuth and elevation angle at which the radar detects a strongest response. Typically, conventional radar systems have antenna array designs that minimize the angular ambiguities based on an optimum wavelength (e.g., element spacings that are smaller than half of the optimum wavelength).

To further avoid these angular ambiguities, other conventional techniques constrain a field of view, which represents a range of angles that are considered possible for the target's angular position. By limiting the field of view, conventional techniques can avoid an ambiguous zone, which has angular ambiguities, and thereby reduce false detections. However, this reduces a range of angles that radar system can monitor to detect the target, which can significantly limit the capability of the radar system. As an example, angular ambiguities can be avoided for a wavelength of 5 millimeters (mm) and an element spacing of 3.5 mm (e.g., the element spacing being 70% of the wavelength) if the field of view is limited to angles between approximately −45 degrees to 45 degrees. Consequently, the radar system may be unable to detect targets that are beyond the 45-degree limits.

As constraints cause the element spacing to increase, such as for radar systems integrated in smaller electronic devices, the angular ambiguities become more prevalent. These angular ambiguities cause multiple peak amplitudes to be present in the spatial response, thereby making it challenging for conventional techniques to determine the angle of the target. In some cases, a highest peak amplitude in the spatial response may not correspond to the target's location. In addition, the multiple peak amplitudes may be within approximately ten decibels of each other, or some other ambiguity threshold for which the radar system cannot confidently determine whether the target is detected in a main lobe or a sidelobe of an antenna pattern. Furthermore, for wide-band radars that are capable of transmitting and receiving radar signals using a wide range of different center wavelengths, the element spacing may not be optimal for each of the different center wavelengths, thereby causing some radar signals to be more susceptible to angular ambiguities than others.

Instead of considering the peak amplitude by itself, techniques for resolving the radar angular ambiguities analyze a shape of the spatial response across a field of view and select a frequency that emphasizes amplitude or phase differences across the spatial response. Typically, the field of view is larger than conventional field of views and includes the ambiguous zone, which is used as a source of information and enables amplitude and phase differences to be analyzed across additional angles. By distinguishing different steering angles via these amplitude and phase differences and identifying characteristics of the shape of the spatial response, the radar can resolve the angular ambiguities and determine the target's angular position. In other words, the techniques for radar angular ambiguity resolution enables the target to have a unique signature for different angular positions. The unique signature can be determined via signal processing techniques, pattern matching, or machine learning.

This document now turns to an example environment, after which an example apparatus, an example method, and an example computing system are described.

Example Environment

FIG. 1 is an illustration of an example environment 100 in which techniques using, and an apparatus including, radar angular ambiguity resolution may be embodied. Environment 100 includes a radar system 102 embedded in a computing device 104. The computing device 104 may use the radar system 102 to detect a presence of a user, map the user's face for authentication, track the user's gestures for touch-free control, track movement of one or more users around the computing device 104 for specific applications, and so forth. The radar system 102 can further determine the user's range and angular position over time.

To integrate the radar system 102 within the computing device 104, an arrangement of antenna elements 106 within the radar system 102 can be based on size or layout constraints of the computing device 104. The radar system 102 can include at least three antenna elements 106, which are positioned in a two-dimensional shape to enable the radar system 102 to determine a two-dimensional vector associated with an angle of arrival of a reflected radar signal (e.g., to determine both an azimuth angle and an elevation angle of a target). In general, two of the antenna elements 106 are positioned along one dimension of the angular space (e.g., an azimuth or horizontal dimension) and another antenna element 106 is positioned along another dimension of the antenna space with respect to one of the two antenna elements 106 (e.g., an elevation or vertical dimension). However, other configurations of the radar system 102 can include two antenna elements 106 such that either the azimuth or the elevation can be estimated by the radar system 102.

Two example radar systems 102 are illustrated in FIG. 1. A first radar system 102-1 includes four antenna elements 106 having an element spacing 108-1 within a rectangular arrangement 110. A second radar system 102-2 includes three antenna elements 106 having another element spacing 108-2 within a triangular arrangement 112. As described herein, the element spacings 108 are determined with respect to centers of contiguous antenna elements 106. In some cases, the element spacing 108 is non-uniform, such as the rectangular arrangement 110, which may have different element spacings 108 along the horizontal and vertical axes of the rectangular arrangement 110. Other configurations of the antenna elements 106 are also possible, such as an "L"

shape configuration in which one of the antenna elements 106 in the rectangular arrangement 110 is removed.

For situations in which the radar system 102 is embedded within a computing device 104, the element spacing, for example, may be between approximately one and five millimeters (mm). In situations in which the element spacing 108 is greater than half a center wavelength of the radar signal (e.g., greater than 60% of the wavelength, 70% of the wavelength, 80% of the wavelength and so forth), ambiguities can make it challenging for the radar system 102 to determine the target's angular position, as described in further detail with respect to FIGS. 2-1 and 2-2.

Figure 2:
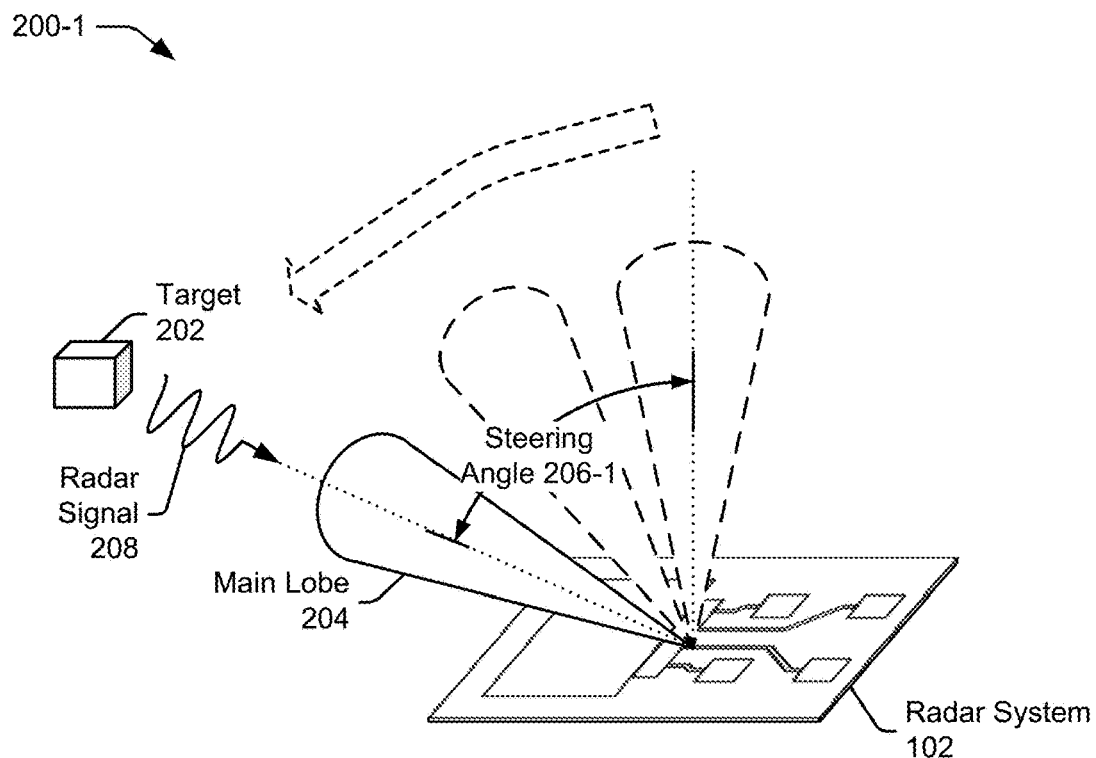
Figure 1:
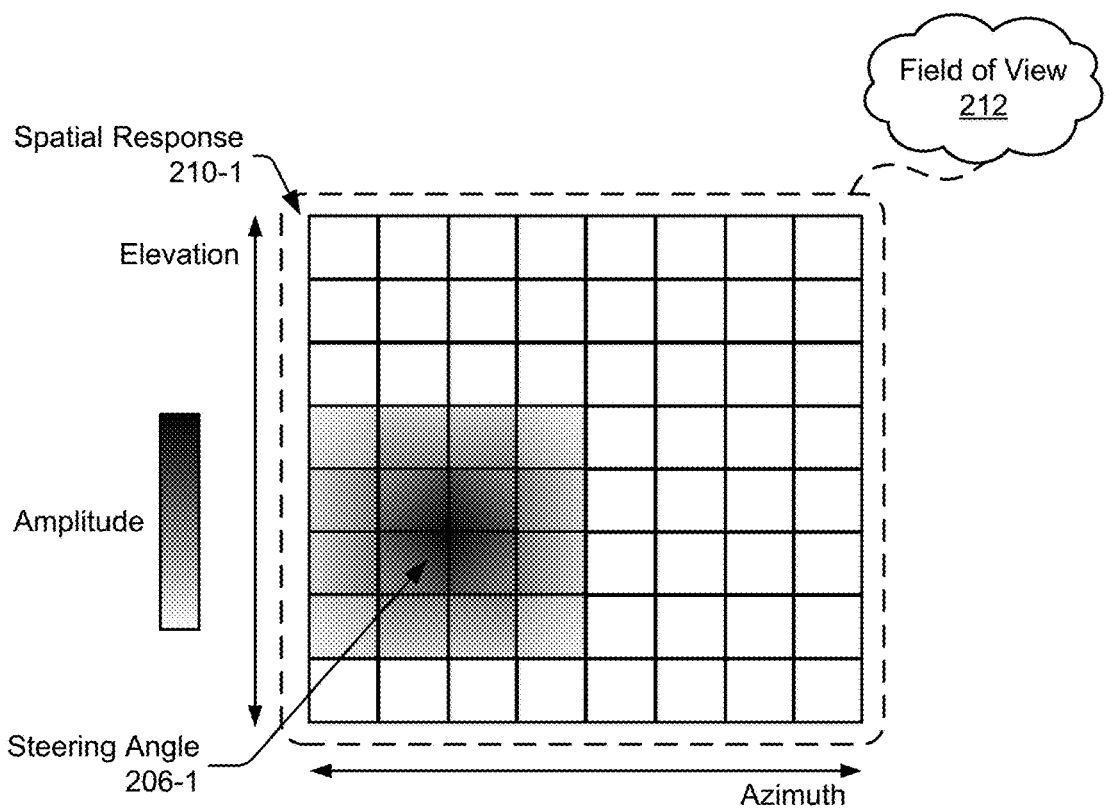
Figure 2:
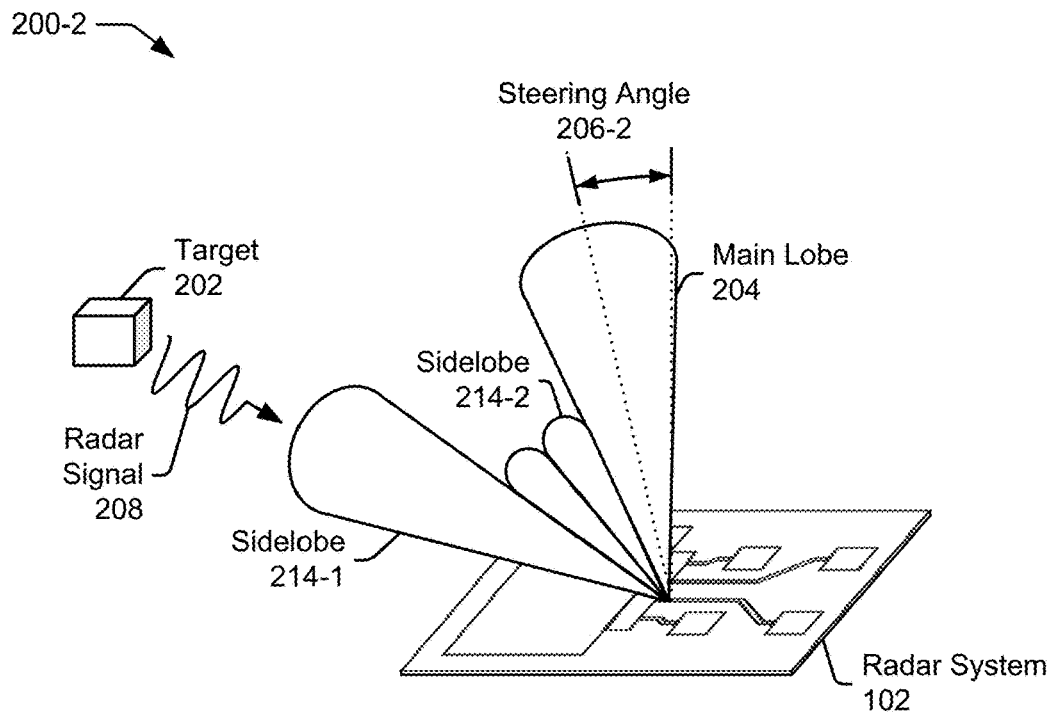
Figure 2:
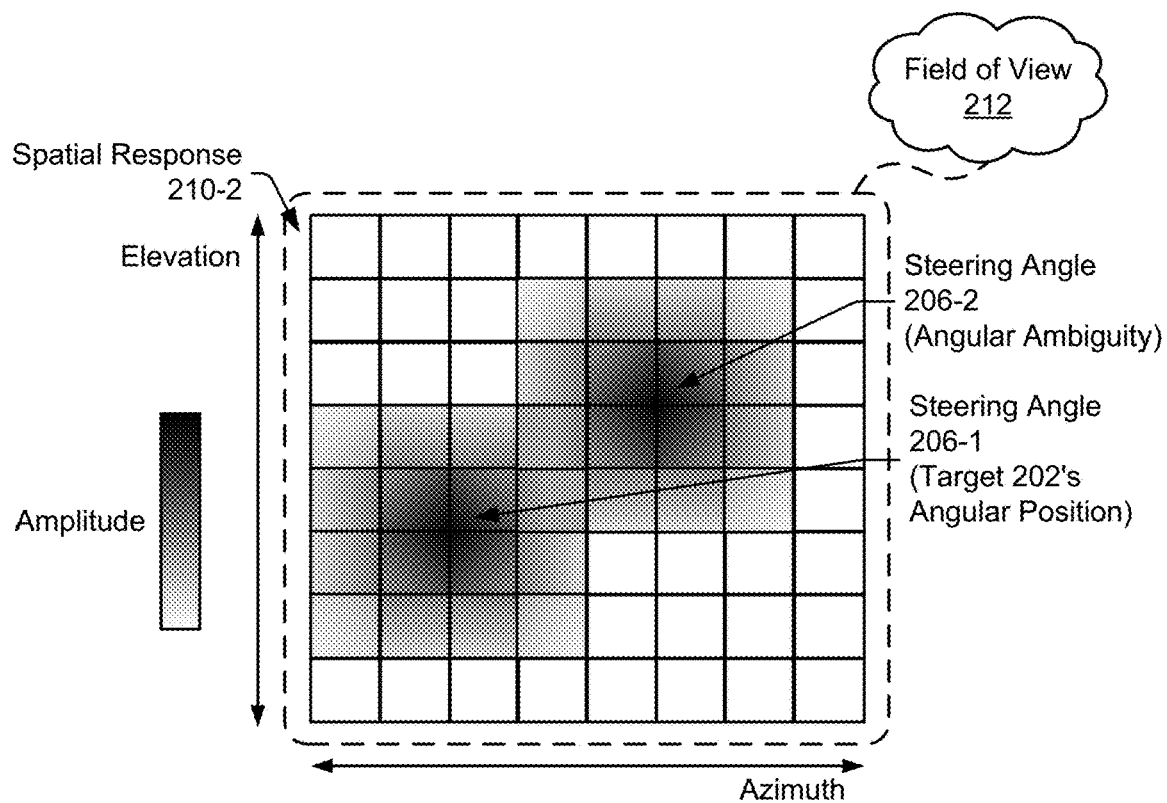

FIG. 2-1 illustrates example beamsteering for target detection. In the depicted environment 200-1, the radar system 102 searches for a target 202 by steering a main lobe 204 of an antenna pattern via digital beamforming techniques. Digital beamforming enables responses from each receiving antenna element 106 in the radar system 102's antenna array to be digitally combined to form multiple simultaneous beams. Generally speaking, the multiple simultaneous beams represent different steering angles 206 of the main lobe 204. A steering angle 206-1, for example, can include a two-dimensional angular direction of the main lobe 204 having an azimuth and an elevation component.

The radar system 102 determines an angular position of the target 202 by detecting a radar signal 208 that is reflected from the target 202 and determining which steering angle 206 corresponds to an angle of arrival of the radar signal 208. Digital beamforming is used to generate a spatial response 210-1, which includes amplitude and phase information for different steering angles 206. In FIG. 2-1, the amplitude information is shown in the spatial response 210-1 via different shadings. A darker shade indicates a higher amplitude and a lighter shade indicates a lower amplitude. Assuming that the highest amplitude represents the angular position of the target 202, the steering angle 206-1 is shown to have the highest amplitude across the field of view 212 (e.g., the range of steering angles 206). However, as shown in FIG. 2-2, angular ambiguities make it such that the highest peak amplitude does not always represent the angular position of the target 202 or that multiple peaks may make challenging to determine which direction corresponds to the target 202's location and whether there is one target 202 or multiple targets 202 in the field of view 212.

FIG. 2-2 illustrates an example angular ambiguity. Although not shown in the environment of 200-1 in FIG. 2-1, the antenna pattern has additional undesired lobes that can be directed towards the target 202 for different steering angles 206. As shown in environment 200-2, these undesired lobes include at least one sidelobe 214 or at least one grating lobe. In general, the sidelobes 214 have an amplitude response that is lower than the main lobe 204 and the grating lobes, which are a type of sidelobe 214, have an amplitude response relatively near the main lobe 204. While conventional techniques may design characteristics of the antenna array to increase an amplitude difference between the main lobe 204 and the sidelobes 214 or decrease the number of grating lobes within the field of view 212, these techniques may not be possible if the radar system 102 is integrated within smaller computing devices 104.

As shown in the environment 200-2, if the main lobe 204 is steered in another direction away from the target 202, such as by steering angle 206-2, the sidelobe 214-1 becomes unintentionally directed towards the target 202. Thus, the resulting spatial response 210-2 has multiple peak amplitudes within the field of view 212; one at the steering angle 206-1 as shown in FIGS. 2-1, and another at the steering angle 206-2. Assuming the amplitudes at these two steering angles 206 are relatively similar, conventional techniques cannot distinguish between whether the target 202 is positioned at the steering angle 206-1 or the steering angle 206-2 (e.g., an angular difference between the two steering angles 206 is insufficient for determining the target 202's angular position). This can further lead conventional radar systems 102 to incorrectly determine that there are additional targets in the environment (e.g., cause false detections) or cause the radar system 102 to identify the position of the target 202 as corresponding to the incorrect steering angle 206 (e.g., the steering angle 206-2). Although the sidelobe 214-1 is described as causing the angular ambiguity in FIG. 2-2, the grating lobe can also cause the angular ambiguity.

Because multiple steering angles 206 can have large amplitudes for a single target 202, determining which of the responses correspond to the target 202 is the challenge that radar angular ambiguity resolution solves. Instead of solely considering which peak has a highest amplitude, techniques for resolving the radar angular ambiguities analyze a shape of the spatial response 210 across the field of view 212. In this case, the field of view 212 includes the ambiguous zone to enable differences in amplitudes or phases to be considered across additional angles. In considering the previous example for a center wavelength of 5 millimeters (mm) and an element spacing of 3.5 mm, the field of view 212 can include angles beyond −45 degrees and 45 degrees, such as angles between approximately −90 degrees to 90 degrees, or up to approximately −180 degrees and 180 degrees. The angular ranges described above can also be applied across one or more directions (e.g., azimuth and/or elevation). Analyzing the shape of the spatial response 210 to estimate the angular position of the target 202 is further explained with respect to FIG. 3.

Figure 3:
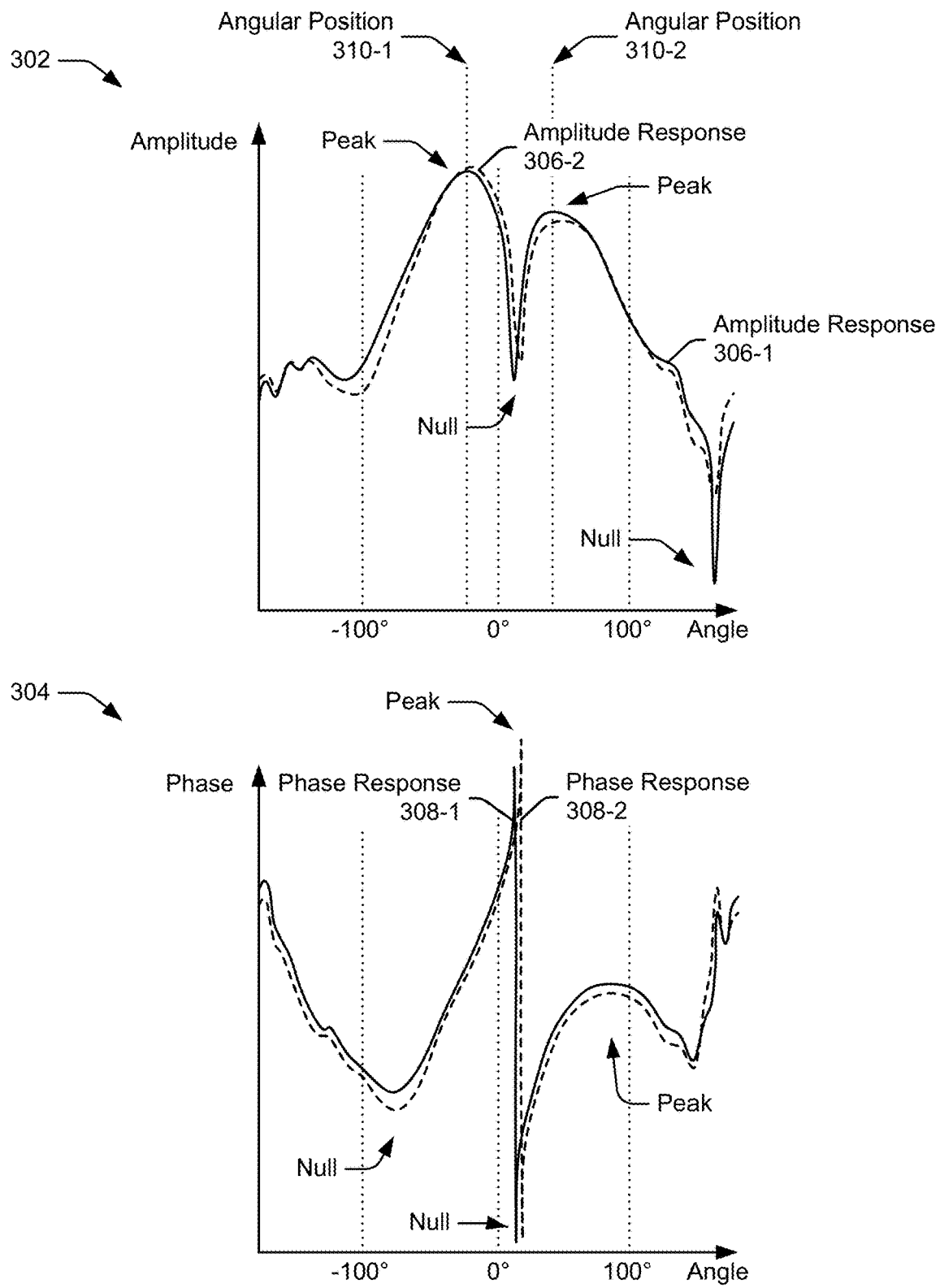
FIG. 3 illustrates example amplitude and phase plots of a spatial response for two angular positions of the target.

FIG. 3 illustrates example amplitude and phase plots of the spatial response 210 for two angular positions of the target 202. The amplitude plot 302 (e.g., amplitude response) and the phase plot 304 (e.g., phase response) respectively depict amplitude and phase differences that can occur for different angular positions of the target and for different steering angles 206. A first amplitude response 306-1 and a first phase response 308-1 are shown for the target 202 positioned at a first angular position 310-1. Likewise, a second amplitude response 308-1 and a second phase response 308-2 are shown for the target 202 positioned at a second angular position 310-2. In this example, the differences are considered across angles between −180 degrees and 180 degrees.

As shown in the amplitude plot 302, an ambiguous zone exists for the two angular positions 310. In this example, the first amplitude response 306-1 (shown via the solid line) has a highest peak at the first angular position 310-1 and a lesser peak at the second angular position 310-2. While the highest peak corresponds to the actual position of the target 202, the lesser peak causes the angular position 310 to be ambiguous. In contrast, the second amplitude response 306-2 (shown via the dotted-line) has a lesser peak at the second angular position 310-2 and a higher peak at the first angular position 310-1. In this case, the lesser peak corresponds to target's location. Both of these amplitude responses 306 illustrate different angular ambiguities that can be solved by analyzing subtle differences in the shapes of the amplitude responses 306. Characteristics of the shape can include, for example, the roll-offs, peak or null widths, angular location of the peaks or nulls, and/or the height or depth of the peaks and nulls. In general, the peaks and nulls occur where a derivative of the amplitude response is zero. The characteristics of the shape can also be associated with a sidelobe, which represents another peak that has less amplitude than a highest peak within the field of view. Additional shape characteristics can also be considered, such as symmetry, or the lack of symmetry. Similar shape characteristics can be analyzed in the phase plot 304. The shapes of the phase responses 308-1 and 308-2 can provide additional information for distinguishing the actual location of the target 202. Based on these analyzed shapes, the angular position of the target 202 can be determined. Some of the peaks and nulls are identified in the amplitude plot 302 and the phase plot 304 of FIG. 3.

Figure 4:
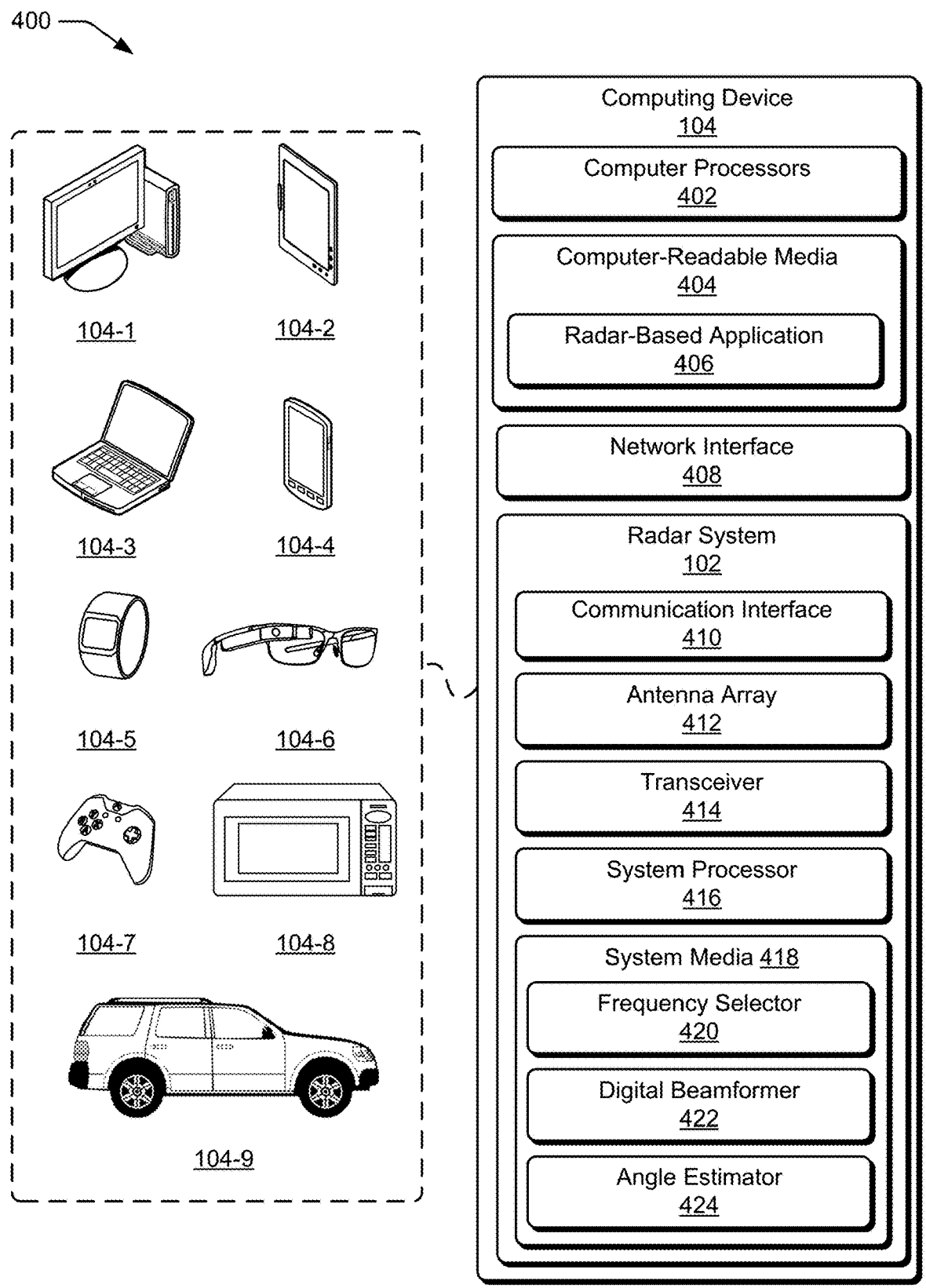
FIG. 4 illustrates an example radar system as part of a computing device.

In more detail, consider FIG. 4, which illustrates the radar system 102 as part of the computing device 104. The computing device 104 is illustrated with various non-limiting example devices including a desktop computer 104-1, a tablet 104-2, a laptop 104-3, a smartphone 104-4, a computing watch 104-5, computing glasses 104-6, a gaming system 104-7, a microwave 104-8, and a vehicle 104-9. Other devices may also be used, such as televisions, drones, track pads, drawing pads, netbooks, e-readers, home-automation and control systems, and other home appliances. Note that computing device 104 can be wearable, non-wearable but mobile, or relatively immobile (e.g., desktops and appliances).

The radar system 102 can be used as a stand-alone radar system or used with, or embedded within, many different computing devices 104 or peripherals, such as in control panels that control home appliances and systems, in automobiles to control internal functions (e.g., volume, cruise control, or even driving of the car), or as an attachment to a laptop computer to control computing applications on the laptop.

The computing device 104 includes one or more computer processors 402 and computer-readable media 404, which includes memory media and storage media. Applications and/or an operating system (not shown) embodied as computer-readable instructions on the computer-readable media 404 can be executed by the computer processors 402 to provide some of the functionalities described herein. The computer-readable media 404 also includes a radar-based application 406, which uses radar data generated by the radar system 102 to perform a function, such as gesture-based control, facial mapping, or user authentication.

The computing device 104 may also include a network interface 408 for communicating data over wired, wireless, or optical networks. For example, the network interface 408 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The computing device 104 may also include a display (not shown).

The radar system 102 includes a communication interface 410 to transmit the radar data to a remote device, though this need not be used when the radar system 102 is integrated within the computing device 104. In general, the radar data provided by the communication interface 410 is in a format usable by the radar-based application 406.

The radar system 102 also includes at least one antenna array 412 and at least one transceiver 414 to transmit and receive the radar signal 208. The antenna array 412 includes at least three antenna elements 106, as described with respect to FIG. 1. In some cases, a portion of the antenna elements 106 can be dedicated for transmitting the radar signal 208 and another portion of the antenna elements 106 can be dedicated for receiving the radar signal 208. In other cases, the antenna elements 106 can be used for both transmission and reception. An element spacing 108 associated with the antenna elements 106 that receive a radar signal can be less than, greater than, or equal to half a center wavelength of the radar signal. Via the antenna array 412, the radar system 102 can form beams that are steered or un-steered, wide or narrow, or shaped (e.g., hemisphere, cube, fan, cone, cylinder). The steering and shaping can be achieved using analog or digital beamforming techniques.

The radar system 102 can be configured for continuous wave or pulsed radar operations. A variety of modulations can be used, including linear frequency modulation, stepped frequency modulations, and phase modulations. The radar system 102 can be configured to emit microwave radiation in a 1 GHz to 400 GHz range, a 4 GHz to 100 GHz range, and narrower bands, such as 57 GHz to 63 GHz. In general, operations of the radar system 102 are associated with a range of frequencies (e.g., a frequency spectrum), a portion of which may be used for transmitting the radar signal 208 based on a center frequency and a bandwidth that are within the frequency spectrum.

The radar system 102 may also include one or more system processors 416 and a system media 418 (e.g., one or more computer-readable storage media). The system media 418 includes a frequency selector 420, a digital beamformer 422, and an angle estimator 424, which can implement, at least partially, radar angular ambiguity resolution.

The frequency selector 420 selects the portion of the frequency spectrum for transmitting the radar signal 208 (e.g., a frequency sub-spectrum that includes a center frequency and a bandwidth). In some cases, the portion of the frequency spectrum is selected based on the element spacing 108 to increase the amplitude and phase differences between at least two different steering angles 206 compared to another frequency sub-spectrum. The frequency selector 420, in other words, enables the angular ambiguity to be resolved by determining a range of frequencies that causes a unique spatial response to exist for different angular positions of the target 202. In effect, the frequencies selected by the frequency selector 420 enhances and emphasizes the differences across at least a portion of the spatial response. Two example frequency selection techniques, single-frequency sub-spectrum selection and multiple-frequency sub-spectrum selection are discussed with respect to FIGS. 5 and 6.

Figure 5:
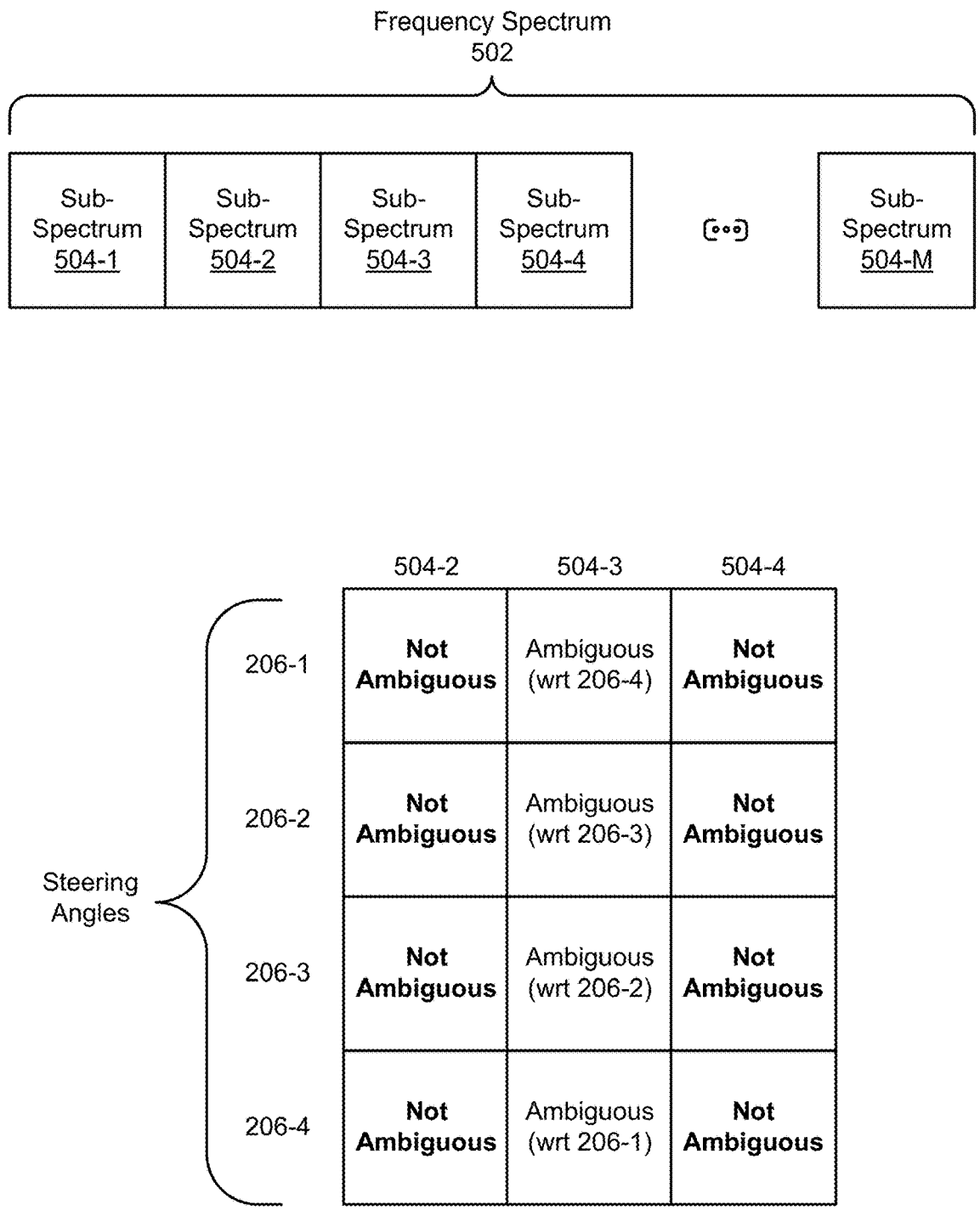
FIG. 5 illustrates example single-frequency sub-spectrum selection for radar angular ambiguity resolution.

FIG. 5 illustrates example single-frequency sub-spectrum selection for radar angular ambiguity resolution. In general, the radar system 102 has a frequency spectrum 502 (e.g., a range of frequencies), which limits available center frequencies and bandwidths for transmitting the radar signal 208. The frequency spectrum 502 can be divided into multiple sub-spectrums 504, such as sub-spectrums 504-1, 504-2, 504-3, 504-4, and 504-M, with the variable "M" representing a positive scalar number. The sub-spectrums 504 can have a same or different bandwidths, such as a bandwidth of 500 megahertz (MHz), one gigahertz (GHz), two gigahertz, and so forth.

For single-frequency sub-spectrum selection, the frequency selector 420 choses one of the frequency sub-spectrums 504 for transmitting the radar signal 208. As the angular ambiguity depends on the center wavelength of the radar signal 208 and the element spacing 108 of the antenna array 412, the frequency sub-spectrum 504 can be determined such that a center frequency of the frequency sub-spectrum 504 reduces the angular ambiguity by reducing the number or amplitude of the sidelobes 214 and the grating lobes. In some cases, the center frequency can be chosen based on a known element spacing 108 that is stored in the system media 418 of the radar system 102 or the computer-readable media 404 of the computing device 104.

As an example, the frequency sub-spectrums 504-2, 504-3, and 504-4 may respectively include frequencies between approximately 57 GHz and 59 GHz, 59 GHz and 61 GHz, 61 GHz and 63 GHz. Assuming that the element spacing 108 is approximately 3.5 mm, the frequency selector 420 can determine that the frequency sub-spectrums 504-2 and 504-4 can reduce the amplitude of the sidelobes compared to the frequency sub-spectrum 504-3. The amplitude of the sidelobes may be reduced, for example, by 0.5 decibel, one decibel, or more. As such, the frequency sub-spectrums 504-2 and 504-4 enable steering angles 206-1, 206-2, 206-3, and 206-4 to be unambiguous using the techniques for radar angular ambiguity resolution. In contrast, the frequency sub-spectrum 504-3 is ambiguous between these steering angles and thus, not selected by the frequency selector 420.

Figure 6:
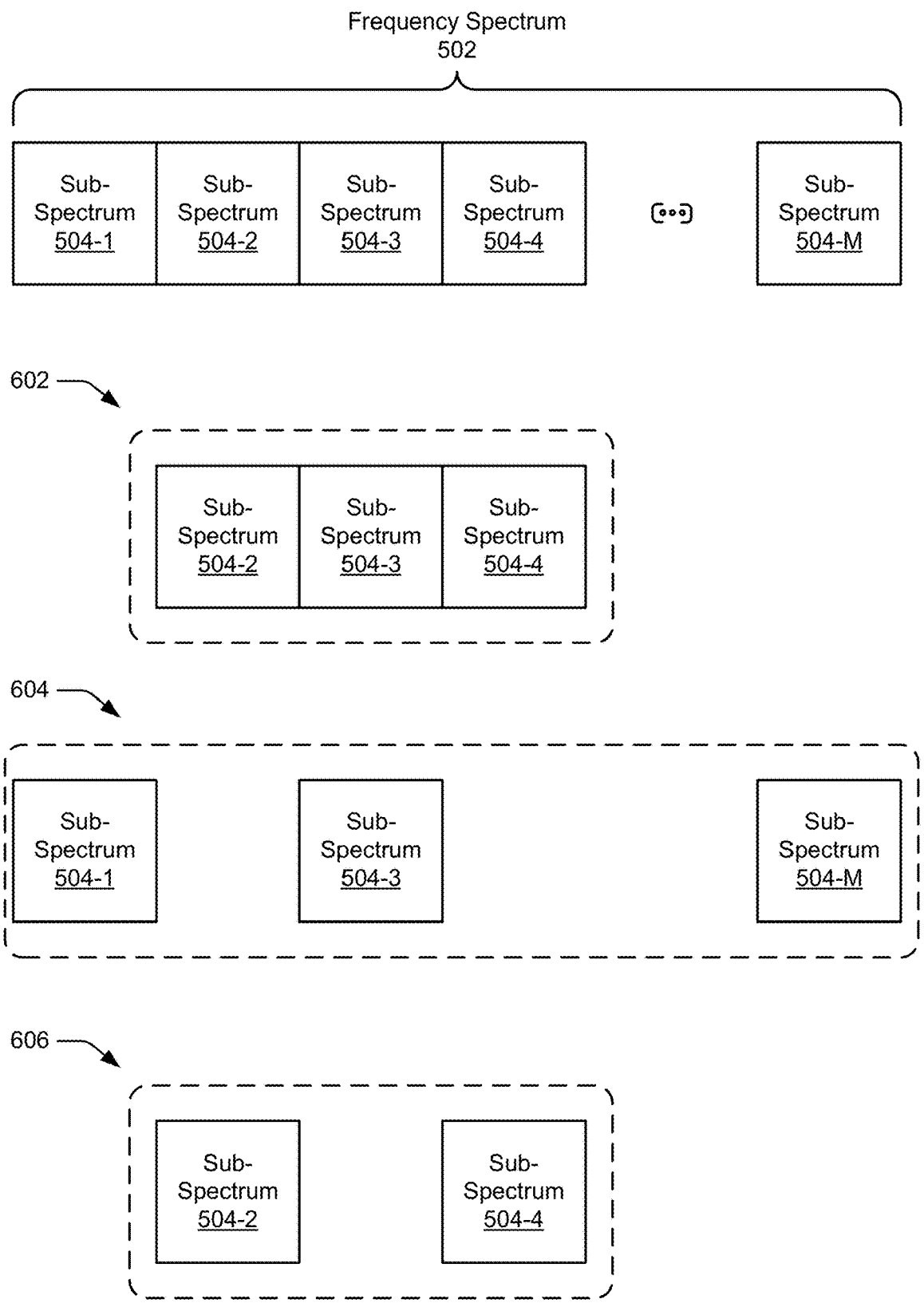
FIG. 6 illustrates example multiple frequency sub-spectrum selection for radar angular ambiguity resolution.

FIG. 6 illustrates example multiple-frequency sub-spectrum selection for radar angular ambiguity resolution. The multiple-frequency sub-spectrum selection enables different distributions of the angular ambiguities to be realized for different frequency sub-spectrums. While shapes and characteristics of the angular ambiguities may change, a main peak that is associated with the target 202 remains with a similar shape in each of the different frequency sub-spectrums.

For multiple-frequency sub-spectrum selection, the frequency selector 420 chooses at least two frequency sub-spectrums 504 for transmitting the radar signal 208. In this situation, the frequency sub-spectrums 504 that are selected for multiple-frequency sub-spectrum selection have a same bandwidth for coherence. The multiple frequency sub-spectrums 504 can be transmitted simultaneously or separated in time using a single radar signal 208 or multiple radar signals 208. Three example multiple-frequency sub-spectrum selections 602, 604, and 606 are depicted in FIG. 6.

The frequency selection 602 includes three contiguous frequency sub-spectrums 504-2, 504-3, and 504-4. In this case, the contiguous frequency sub-spectrum selection enables one radar signal 208 to be transmitted with a bandwidth that encompasses the three contiguous frequency sub-spectrums 504. Upon receiving the reflected radar signal 208, the spatial response 210 can be partitioned according to the different frequency sub-spectrums 504.

In contrast to frequency selection 602, the frequency selection 604 includes three non-contiguous frequency sub-spectrums 504-1, 504-3, and 504-M. The non-contiguous frequency sub-spectrums 504 enable further separation between the selected frequency sub-spectrums 504, which can further emphasize the amplitude and phase differences between different steering angles 206. Generally speaking, the farther the frequency sub-spectrums 504 are separated with respect to one another, the easier it is for the radar system 102 to resolve the angular ambiguities.

Another frequency selection 606 is also shown to indicate that two frequency sub-spectrums, such as frequency sub-spectrums 504-2 and 504-4, may be selected by the frequency selector 420. This may be beneficial for situations in which it is desirable to reduce a number of computations or for which additional information that is provided by selecting another frequency sub-spectrum 504 is not required. As shown in FIG. 6, any combination of the frequency sub-spectrums can be used for multiple-frequency sub-spectrum selection. Using these frequency sub-spectrums 504, phase coherent maps are generated and used to estimate the angular position of the target 202, as described in further detail with respect to FIG. 8.

Returning to FIG. 6, after the frequency selector 420 causes the transceiver 414 to transmit the radar signal 208 using the selected frequency sub-spectrum 504, the antenna elements 106 of the antenna array 412 receive the radar signal 208, which is reflected by the target 202. The system processor 316 processes the responses from the antenna elements 106 to detect the target 202 and determine the angular position of the target 202, as shown in FIG. 7.

Figure 7:
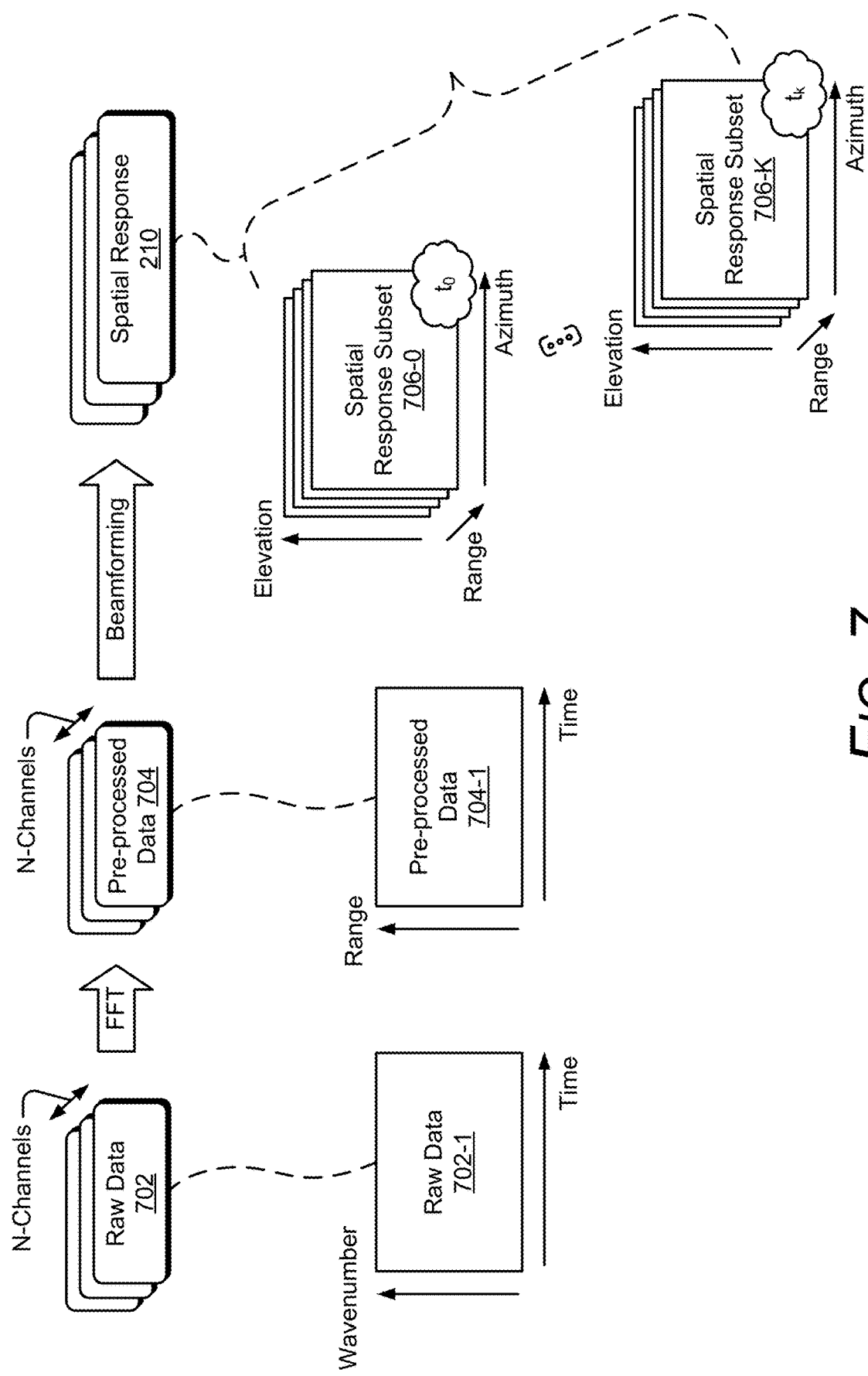
FIG. 7 illustrates example radar signal processing techniques for radar angular ambiguity resolution.

FIG. 7 illustrates example radar signal processing techniques for radar angular ambiguity resolution. The system processor 316 produces raw data 702, which represents digital responses from each of the antenna elements 106 of the antenna array 412 that are used to receive the radar signal 208. In general, the responses from each of the antenna elements 106 are processed by separate receive channels, which are represented by N-channels in FIG. 7, with "N" representing a positive scalar value. The raw data 702 contains digital information (e.g., in-phase and quadrature data) across a period of time and for different wavenumbers associated with the radar signal 208, as shown by raw data 702-1, which is associated with one of the N-channels. The system processor 416 performs a Fast-Fourier Transform (FFT) on the raw data 702 to generate pre-processed data 704. The pre-processed data 704 includes digital information across the period of time and for different ranges (e.g., range bins), as shown by pre-processed data 704-1, which is associated with one of the N-channels.

The digital beamformer 422 of FIG. 4 receives the pre-processed data 404 and generates the spatial responses 210. The spatial response 210 includes the amplitude and phase information, examples of which are illustrated in FIGS. 2-1, 2-2, and 3. The spatial response includes spatial response subsets 706-0 through 706-K, which include a set of spatial responses 210 for different time intervals, such as time $t_0$ and time $t_k$. In this case, "K" represents a positive scalar value.

Each spatial response 210 within the spatial response subset 706 contains digital information for a set of azimuths, elevations, and ranges. The set of azimuths and elements represent the field of view 212 for which different steering angles or beams are formed by the digital beamformer 422. The techniques for radar angular ambiguity resolution can be used with any number of beams. As an example, the digital beamformer 422 can generate approximately 2000 beams, 4000 beams, 6000 beams, and so forth.

The angle estimator 424 of FIG. 4 receives the spatial response 210 and estimates the angular position of the target 202 by analyzing the shape of the spatial response 210 across the field of view 212. In some aspects, the angle estimator 424 can use signal processing techniques, pattern matching techniques, or machine learning to determine the angle of arrival of the radar signal 208. Example signal processing techniques can utilize algorithms to analyze the shape of the spatial response 210 and determine differences that indicate the direction of the target 202. In general, analyzing the shape of the spatial response 210 determines one or more characteristics of the shape, such as peak roll-offs, null shapes, angles associated with peaks or nulls, or asymmetrical forms. These characteristics can be determined based on one amplitude other than a maximum amplitude (e.g., an amplitude associated with a lesser peak or another null), at least two amplitudes, either of which may or may not be associated with the maximum amplitude (e.g., to determine a slope associated with a peak or a width of a null), a phase, both amplitude and phase, and so forth.

Alternatively, example pattern matching techniques may compare characteristics of the spatial response 210 to predetermined patterns or previously generated spatial responses 210 that are stored in the system media 418 of the radar system 102 or the computer-readable media 404 of the computing device 104. Example machine learning techniques can evaluate changes that occur in the spatial response 210 over time. Based on these changes, the machine learning can detect a moving target 202 and record information for detecting future targets at the identified angle of the target 202. To reduce the complexity of the machine learning, a portion of the spatial response can be provided for machine learning to decrease a number of computations. The portion, for example, can be based on a range slice that includes a maximum amplitude response compared to the other ranges. If multiple-frequency sub-spectrum selection is chosen by the frequency selector 420, the angle estimator 424 can perform complex coherence, as described with respect to FIG. 8, to identify the target 202's position based on differences that occur in the shape of the angular ambiguities for different frequency sub-spectrums.

Figure 8:
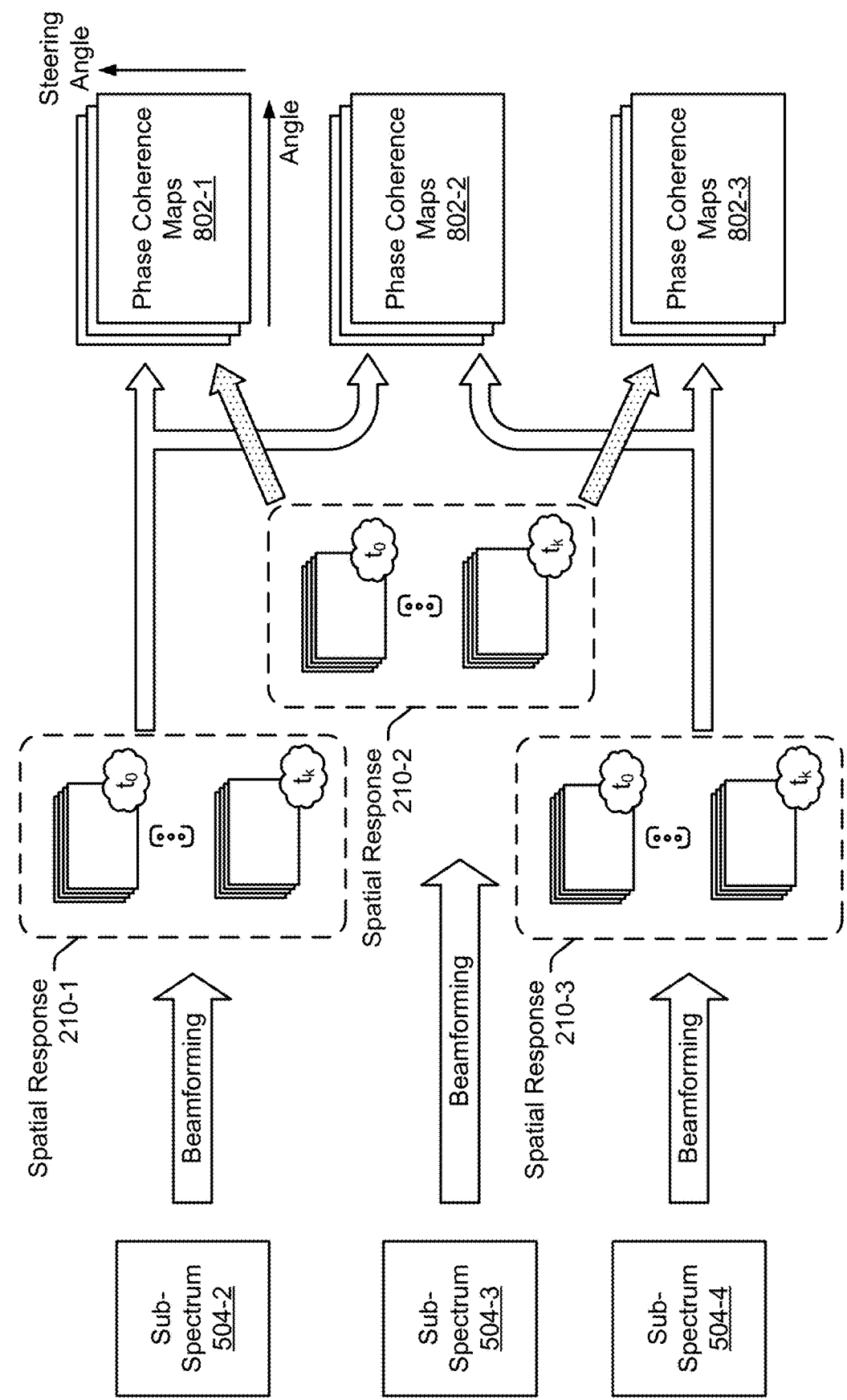
FIG. 8 illustrates example complex coherence for radar angular ambiguity resolution.

FIG. 8 illustrates complex coherence for radar angular ambiguity resolution. Assuming the frequency selection 602 of FIG. 6 was chosen by the frequency selector 420, the digital beamformer 422 processes each of the frequency sub-spectrums 504-2, 504-3, and 504-4 to respectively generate spatial responses 210-1, 210-2, and 210-3. Using these spatial responses 210, the angle estimator 424 performs complex coherence to generate phase coherence maps 802-1, 802-2, and 802-3. The phase coherence maps 802 contain phase information of the complex coherence (e.g., interferogram) between pairs of beamforming reconstructions. Due to the different frequency sub-spectrums 504, the angle estimator 424 can use the phase coherence maps 802 to determine the target 202's position because a portion of the spatial response 210 that is associated with the target 202, in general, remains with a similar shape in each of the different frequency sub-spectrums while shapes of the angular ambiguities can differ.

The phase information is computed according to Equation 1:

$$\theta = \frac{\text{Angle}(E\{S_1 S_2^*\})}{\sqrt{E\{|S_1|^2\}E\{|S_2|^2\}}} \qquad \text{Equation 1}$$

where $S_n$ represents a signal received by antenna element "n," $E\{\ \}$ represents an expected value estimation, and "*" represents a complex conjugate.

As shown by the arrows in FIG. 8, the phase coherence maps 802-1, 802-2, and 802-3 are respectively computed using the spatial responses 210 associated with the frequency sub-spectrum 504-2 and 504-3, the frequency sub-spectrum 504-2 and 504-4, and the frequency sub-spectrums 504-3 and 504-4. In general, every possible target position within the field of view 212 has a unique phase coherence map 802, which can be identified by the angular estimator 424.

Example Methods

Figure 9:
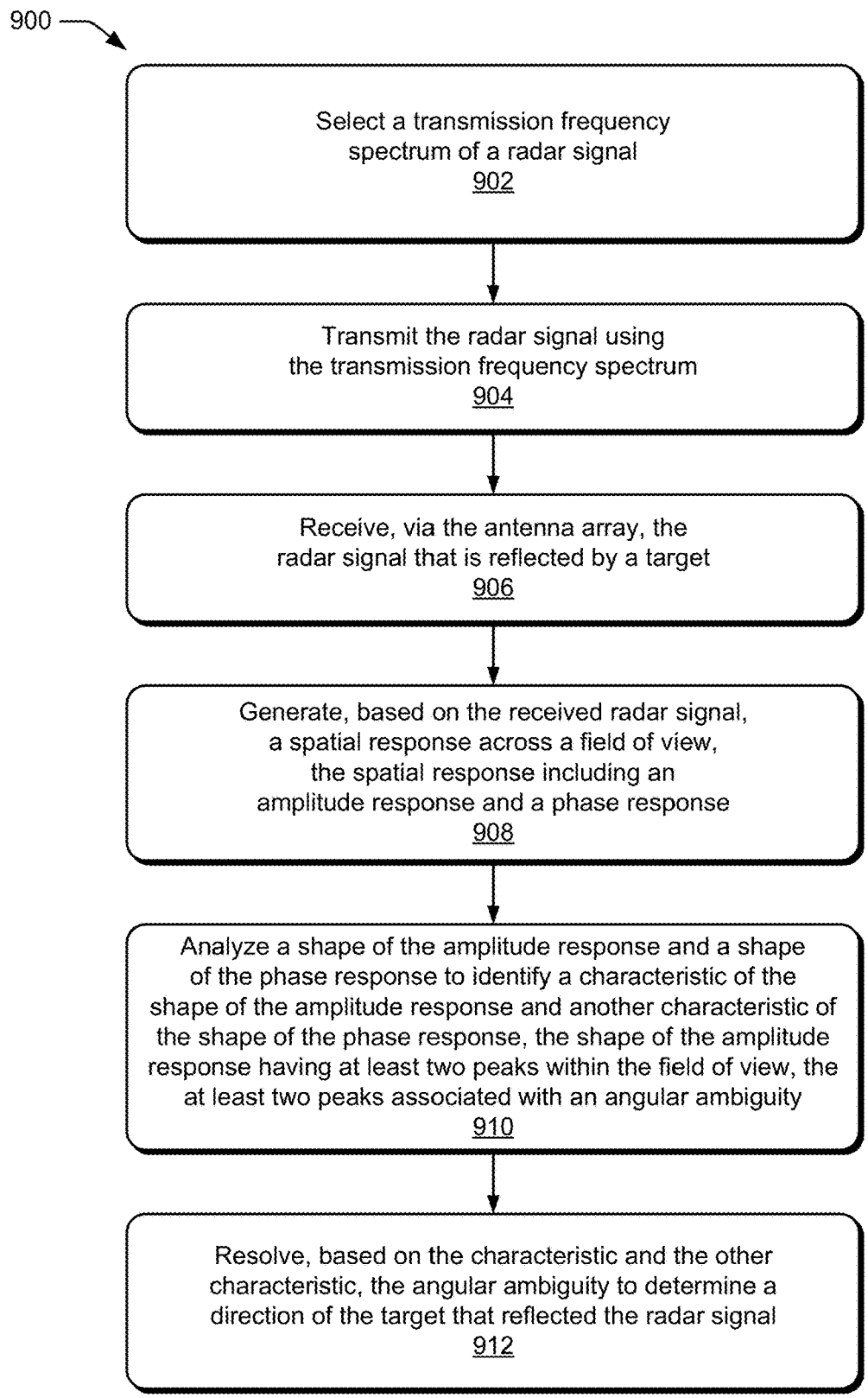
FIG. 9 illustrates an example method for radar angular ambiguity resolution.

FIG. 9 depicts an example method 900 for radar angular ambiguity resolution. Method 900 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environment 100, 200-1, and 200-2 of FIGS. 1, 2-1, and 2-2 and entities detailed in FIG. 4, reference to which is made for example only. The techniques are not limited to performance by one entity or multiple entities operating on one device.

At 902, a transmission frequency spectrum of a radar signal is selected. For example, the transmission frequency spectrum may include a frequency sub-spectrum 504 within the frequency spectrum 502 of the radar system 102. The transmission frequency spectrum may have a center wavelength that is greater than, less than, or equal to twice an element spacing of an antenna array. Example wavelengths may be approximately 50%, 75%, 110%, 120%, 150%, or 200% of the element spacing 108. Assuming the element spacing 108 is approximately 3.5 mm, the transmission frequency spectrum may include frequencies between approximately 57 GHz and 62 GHz, which have respective wavelengths between approximately 5.3 mm and 4.8 mm. The frequency selector 420 can further determine the transmission frequency spectrum of the radar signal 208 based on the element spacing 108 of the antenna array 412's antenna elements 106. The transmission frequency spectrum may be chosen to enhance and emphasize amplitude or phase differences that are associated with different locations of the target 202 or different steering angles 206. The transmission frequency spectrum may also include at least one frequency or a range of frequencies, such as those used for frequency modulation. The transmission frequency spectrum can further include multiple frequency sub-spectrums 504 that are transmitted individually, simultaneously, or as one contiguous frequency sub-spectrum.

At 904, the radar signal is transmitted using the transmission frequency spectrum. For example, the frequency selector 420 can cause the transceiver 414 to transmit the radar signal 208.

At 906, the radar signal that is reflected by a target is received via an antenna array. For example, the antenna array 412 receives the radar signal 208 that is reflected by the target 202 shown in FIGS. 2-1 and 2-2. The antenna array 412 can include at least three antenna elements 106, as shown in FIG. 1.

At 908, a spatial response across a field of view is generated based on the received radar signal. The spatial response includes an amplitude response and a phase response. The digital beamformer 422, for example, can generate the spatial response 210, which contains amplitude and phase information for different steering angles 206, range bins, and time intervals. Example spatial responses 210 or portions of spatial responses 210 are depicted in FIGS. 2-1, 2-2, 3, 7, and 8.

At 910, a shape of the amplitude response and a shape of the phase response are analyzed to identify a characteristic of the shape of the amplitude response and another characteristic of the shape of the phase response. The shape of the amplitude response has at least two peaks within the field of view, which are associated with an angular ambiguity. The characteristic of the amplitude response or the phase response may include one or more amplitudes or phases associated with a shape of a peak, a null, or a sidelobe across one or more angles within the field of view. Example shape characteristics can include slopes (e.g., derivatives), heights or depths, widths, and asymmetrical forms and so forth. The at least two peaks may be associated with an angular ambiguity based on the at least two peaks having an amplitude difference that is within an ambiguity threshold, such as less than approximately ten decibels.

At 912, the angular ambiguity is resolved based on the characteristic and the other characteristic to determine a direction of the target that reflected the radar signal. These characteristics, for example, can be used by signal processing algorithms, pattern matching techniques, or machine learning techniques that are implemented by the angle estimator 424 to resolve the angular ambiguity. In general, the transmission frequency spectrum and the shape of the spatial response 210 enables the target 202 to have a unique signature at different directions, thereby enabling the radar system 102 to resolve the angular ambiguity and estimate the angular position of the target 202. The determined direction of the target can then be used by the radar-based application 406 to track a user's gesture, detect approaching obstacles, map a user's face for authentication, and so forth.

Example Computing System

Figure 10:
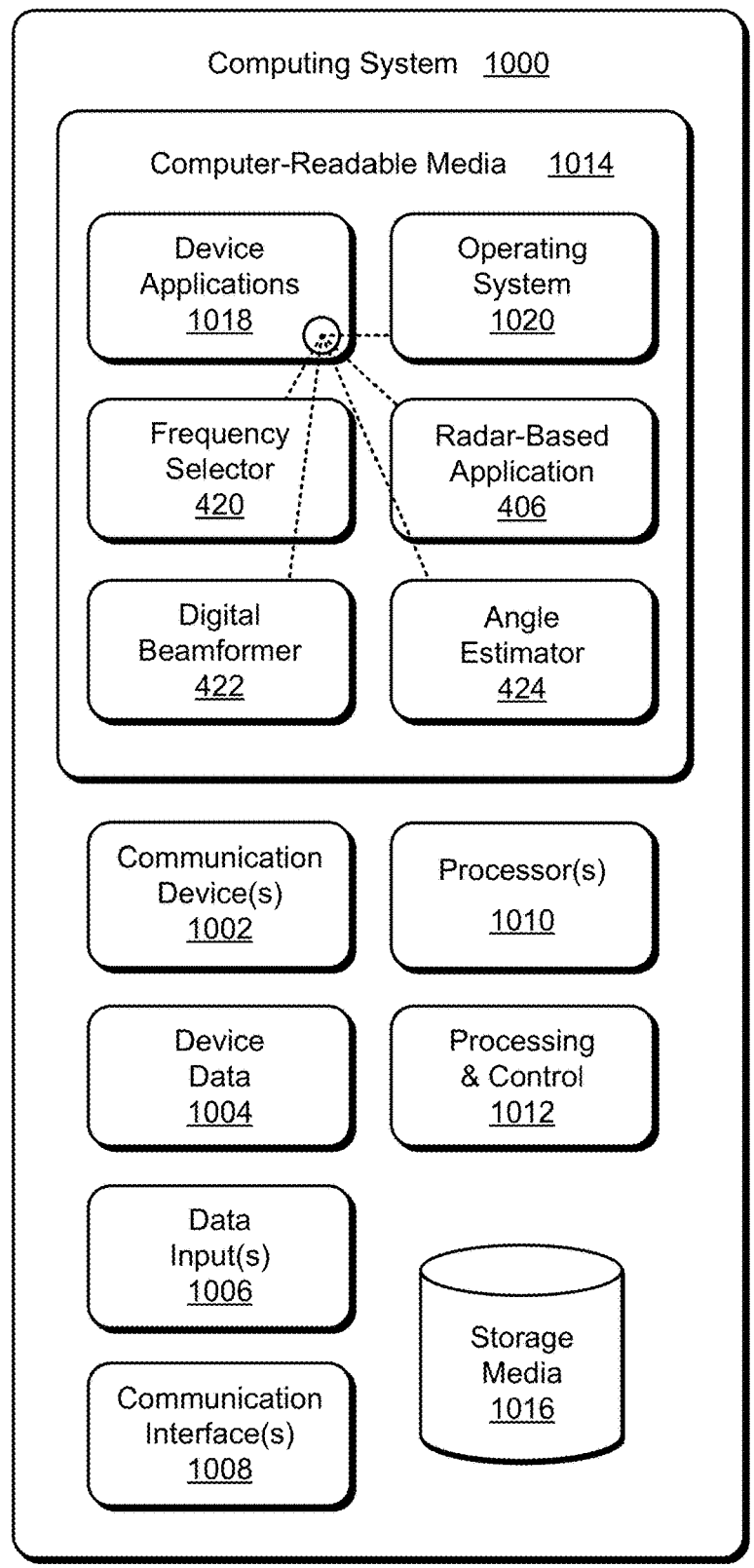
FIG. 10 illustrates an example computing system embodying, or in which techniques may be implemented that enable use of, radar-based force sensing.

FIG. 10 illustrates various components of example computing system 1000 that can be implemented as any type of client, server, and/or computing device as described with reference to the previous FIGS. 1 and 4 to implement radar angular ambiguity resolution.

The computing system 1000 includes communication devices 1002 that enable wired and/or wireless communication of device data 1004 (e.g., received data, data that is being received, data scheduled for broadcast, data packets of the data). The device data 1004 or other device content can include configuration settings of the device, media content stored on the device, and/or information associated with a user of the device. Media content stored on the computing system 1000 can include any type of audio, video, and/or image data. The computing system 1000 includes one or more data inputs 1006 via which any type of data, media content, and/or inputs can be received, such as human utterances, the radar-based application 406, pre-determined spatial responses for angle estimation or information regarding element spacing 108 of radar system 102 within the computing system 1000, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, radar angular ambiguity resolution. Alternatively or in addition, the computing system 1000 can be implemented with any one or combination of hardware, firmware, or fixed logic circuitry that is implemented in connection with processing and control circuits which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes a computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control module, code that is native to a particular device, a hardware abstraction layer for a particular device, and so on.

The device applications 1018 also any include system components, engines, or managers to implement radar angular ambiguity resolution. In this example, device applications 1018 include the frequency selector 420, digital beamformer 422, and the angle estimator 424.

Conclusion

Although techniques using, and apparatuses including, radar angular ambiguity resolution have been described in language specific to features and/or methods, it is to be understood that the subject of the appended claims is not necessarily limited to the specific features or methods described. Rather, the specific features and methods are disclosed as example implementations of radar angular ambiguity resolution.

What is claimed is:
1. A radar system comprising:
an antenna array comprising multiple antenna elements, the antenna array configured to receive a radar signal using the multiple antenna elements; and
a processor configured to:
generate, based on the received radar signal and using digital beamforming, a spatial response across a field of view;
characterize a shape of the spatial response across the field of view based on two or more data points within the spatial response; and
determine, based on the shape of the spatial response, an angle of arrival of the radar signal to estimate an angular position of an object that reflected the radar signal.

2. The radar system of claim 1, wherein:
the spatial response includes an amplitude response;
the shape of the amplitude response across the field of view includes at least two amplitude peaks and at least one amplitude null; and
the processor is further configured to determine the angle of arrival of the radar signal based on shapes of the at least two amplitude peaks and a shape of the at least one amplitude null.

3. The radar system of claim 2, wherein:
the at least two amplitude peaks includes a first peak having a first amplitude and a second amplitude peak having a second amplitude; and
an amplitude difference between the first amplitude and the second amplitude is within an ambiguity threshold such that the amplitude difference, by itself, is insufficient for determining the angle of arrival of the radar signal.

4. The radar system of claim 1, wherein the processor is configured to characterize the shape of the spatial response based on one or more of the following:
steepness of peak roll-offs within the spatial response;
widths of peaks within the spatial response;
widths of nulls within the spatial response;
angular locations of the peaks within the spatial response;
angular locations of the nulls within the spatial response;
heights of the peaks within the spatial response;
depths of the nulls within the spatial response; or
symmetry across the spatial response.

5. The radar system of claim 1, wherein:
the spatial response includes a phase response;
the shape of the phase response across the field of view includes at least one phase peak and at least one phase null; and
the processor is further configured to determine the angle of arrival of the radar signal based on a shape of the at least one phase peak and a shape of the at least one phase null.

6. The radar system of claim 1, wherein the field of view is greater than approximately ninety degrees.

7. The radar system of claim 1, wherein:
the radar signal is associated with a frequency spectrum;
the frequency spectrum is associated with a center wavelength; and
the multiple antenna elements each have an element spacing that is greater than half of the center wavelength.

8. The radar system of claim 1, wherein the multiple antenna elements comprise at least three antenna elements that are positioned in a triangular arrangement.

9. A method comprising:
receiving, via an antenna array, a radar signal using multiple antenna elements of the antenna array;
generating, based on the received radar signal and using digital beamforming, a spatial response across a field of view;
characterizing a shape of the spatial response across the field of view based on two or more data points within the spatial response; and
determining, based on the shape of the spatial response, an angle of arrival of the radar signal to estimate an angular position of an object that reflected the radar signal.

10. The method of claim 9, wherein:
the spatial response includes an amplitude response;
the shape of the amplitude response across the field of view includes at least two amplitude peaks and at least one amplitude null; and
the determining the angle of arrival further comprises determining the angle of arrival based on shapes of the at least two amplitude peaks and a shape of the at least one amplitude null.

11. The method of claim 10, wherein:
the at least two amplitude peaks includes a first peak having a first amplitude and a second amplitude peak having a second amplitude; and
an amplitude difference between the first amplitude and the second amplitude is within an ambiguity threshold.

12. The method of claim 9, wherein the characterizing the shape of the spatial response comprises one or more of the following:
characterizing steepness of peak roll-offs within the spatial response;
characterizing widths of peaks within the spatial response;
characterizing widths of nulls within the spatial response;
characterizing angular locations of the peaks within the spatial response;
characterizing angular locations of the nulls within the spatial response;
characterizing heights of the peaks within the spatial response;
characterizing depths of the nulls within the spatial response; or
identifying symmetry across the spatial response.

13. The method of claim 9, wherein:
the spatial response includes a phase response;
the shape of the phase response across the field of view includes at least one phase peak and at least one phase null; and
the determining the angle of arrival further comprises determining the angle of arrival based on a shape of the at least one phase peak and a shape of the at least one phase null.

14. A method comprising:
receiving, via an antenna array, a radar signal using multiple antenna elements of the antenna array, the radar signal comprising multiple frequencies associated with multiple frequency sub-spectrums;
generating, based on the received radar signal and using digital beamforming, spatial responses across a field of view, the spatial responses respectively associated with the multiple frequency sub-spectrums, each spatial response comprising an amplitude response having at least two amplitude peaks within the field of view, the amplitude peaks associated with an angular ambiguity; and
resolving the angular ambiguity to determine a direction to an object that reflected the radar signal, the resolving comprising:
characterizing a shape of at least one of the spatial responses across the field of view based on two or more data points within the spatial response, the shape identifying one of the amplitude peaks as being associated with the direction to the object; or
generating a phase coherence map using complex coherence and at least two of the spatial responses; and identifying the direction to the object based on the phase coherence map.

15. The method of claim 14, wherein:
  the generating of the phase coherence map comprises generating multiple phase coherence maps using different combinations of the spatial responses; and
  the identifying of the direction comprises identifying a similar shape across the multiple phase coherence maps, the similar shape associated with the direction to the object.

16. The method of claim 14, wherein the multiple frequency sub-spectrums comprise:
  a first frequency sub-spectrum comprising frequencies between approximately 57 and 59 gigahertz; and
  a second frequency sub-spectrum comprising frequencies between approximately 61 and 63 gigahertz.

17. The method of claim 14, wherein bandwidths of the multiple frequency sub-spectrums are approximately equal.

18. The method of claim 17, wherein the bandwidths are approximately two gigahertz.

19. The method of claim 14, wherein the multiple frequency sub-spectrums comprise at least two frequency sub-spectrums that are contiguous.

20. The method of claim 14, wherein the multiple frequency sub-spectrums comprise at least two frequency sub-spectrums that are disjoint.

\* \* \* \* \*